United States Patent
Mercey et al.

(10) Patent No.: US 9,555,685 B2
(45) Date of Patent: Jan. 31, 2017

(54) AIR OUTLET FOR A MOTOR VEHICLE DASHBOARD

(75) Inventors: Nicolas Mercey, Allonne (FR); René-Louis Coutel, Dunkerque (FR)

(73) Assignee: Faurecia Interieur Industrie, Nanterre (FR)

( * ) Notice: Subject to any disclaimer, the term of this patent is extended or adjusted under 35 U.S.C. 154(b) by 647 days.

(21) Appl. No.: 13/578,503

(22) PCT Filed: Jan. 20, 2011
(Under 37 CFR 1.47)

(86) PCT No.: PCT/FR2011/050102
§ 371 (c)(1),
(2), (4) Date: Mar. 28, 2013

(87) PCT Pub. No.: WO2011/098697
PCT Pub. Date: Aug. 18, 2011

(65) Prior Publication Data
US 2014/0199932 A1 Jul. 17, 2014

(30) Foreign Application Priority Data
Feb. 10, 2010 (FR) .................................... 10 50915

(51) Int. Cl.
*B60H 1/24* (2006.01)
*B60H 1/00* (2006.01)
*B60H 1/34* (2006.01)

(52) U.S. Cl.
CPC ........ *B60H 1/00457* (2013.01); *B60H 1/3421* (2013.01); *B60H 2001/3471* (2013.01)

(58) Field of Classification Search
CPC .................... B60H 1/3421; B60H 2001/3471; B60H 1/00457

(Continued)

(56) References Cited

U.S. PATENT DOCUMENTS 3,552,295 A * 1/1971 Armstrong .................... 454/315
4,665,804 A * 5/1987 Miyasaka ..................... 454/315
(Continued)

FOREIGN PATENT DOCUMENTS

| DE | 10132186 | 1/2003 |
|----|----------|--------|
| DE | 202004006461 | 8/2004 |
| DE | 202006009352 | 8/2006 |

OTHER PUBLICATIONS

International Search Report for PCT/FR2011/050102, dated Mar. 15, 2011, 3 pages.

(Continued)

*Primary Examiner* — Steven B McAllister
*Assistant Examiner* — Jonathan Cotov
(74) *Attorney, Agent, or Firm* — Reising Ethington P.C.

(57) ABSTRACT

The invention relates to an air outlet device (1) that includes a first blade (4), extending longitudinally and being rotatable around a longitudinal axis (A), and at least one second blade (6), extending transversely and being rotatable around a transverse axis (B), the device comprising an actuator (8) connected to the first (4) and to the second blade (6) and being rotatably secured to the first blade (4) and being translatably mobile on said first blade (4). The first blade (4) includes at least one projection (38) extending transversely from a longitudinal surface (22) of the first blade (4), the actuator (8) comprising an opposite projection (40) that extends transversely opposite said longitudinal surface (22) such that the projection (38) pushes the opposite projection (40) when the actuator (8) is translatably moved.

14 Claims, 3 Drawing Sheets

(58) Field of Classification Search
USPC .......................................... 454/155, 315, 162
See application file for complete search history.

(56) References Cited

U.S. PATENT DOCUMENTS

| | | | | |
|---|---|---|---|---|
| 4,796,518 | A * | 1/1989 | Murray | 454/155 |
| 4,905,580 | A * | 3/1990 | Komori | B60H 1/3414 |
| | | | | 454/155 |
| 5,338,252 | A * | 8/1994 | Bowler et al. | 454/155 |
| 5,480,350 | A * | 1/1996 | Naruse | 454/155 |
| 5,599,230 | A * | 2/1997 | Naruse et al. | 454/155 |
| 5,766,070 | A * | 6/1998 | Schwarz | 454/155 |
| 5,921,861 | A * | 7/1999 | Yoon | 454/285 |
| 6,113,487 | A * | 9/2000 | Kim | 454/202 |
| 6,443,831 | B2 * | 9/2002 | Yabuya et al. | 454/155 |
| 6,497,616 | B2 * | 12/2002 | Yamaguchi | 454/155 |
| 6,589,110 | B2 * | 7/2003 | Tanabe et al. | 454/155 |
| 7,780,508 | B2 * | 8/2010 | Okuno | 454/155 |
| 2001/0031619 | A1 * | 10/2001 | Yabuya et al. | 454/155 |
| 2003/0022615 | A1 * | 1/2003 | Hanft | 454/155 |
| 2004/0092225 | A1 * | 5/2004 | Gehring et al. | 454/155 |
| 2004/0171344 | A1 * | 9/2004 | Krause | 454/315 |
| 2006/0014485 | A1 * | 1/2006 | Sousa | B60H 1/3421 |
| | | | | 454/315 |
| 2007/0111653 | A1 * | 5/2007 | Endou | 454/155 |
| 2009/0286462 | A1 * | 11/2009 | Goto | 454/155 |

OTHER PUBLICATIONS

Written Opinion for PCT/FR2011/050102, dated Mar. 15, 2011, 4 pages (in French only).

* cited by examiner

AIR OUTLET FOR A MOTOR VEHICLE DASHBOARD

TECHNICAL FIELD

The present invention relates to an air outlet device for an aeration system for a motor vehicle, of the type comprising at least one first blade, extending substantially longitudinally and being rotatable around a substantially longitudinal axis, and at least one second blade, extending substantially transversely and being rotatable around a substantially transverse axis, the device comprising an actuator connected to the first blade and second blade, said actuator being rotatably secured to the first blade so as to allow the movement of the first blade around the longitudinal axis and being translatable on said first blade so as to allow the movement of the second blade around the transverse axis.

The invention also relates to a dashboard comprising such an air outlet device.

BACKGROUND

The aeration system of the passenger cabin of a motor vehicle generally emerges in at least one opening provided in the dashboard of the vehicle. An air outlet device closes said opening and makes it possible to control the direction of the flow of air leaving the aeration system.

Such an air outlet device for example comprises a first set of substantially horizontal blades and a second set of substantially vertical blades, the sets being rotatably mounted and extending in front of one another through the air outlet opening. Rotating the horizontal blades makes it possible to orient the flow of air upward or downward, and rotating the vertical blades makes it possible to rotate the flow of air to the right or to the left. In order to rotate the blades, an actuator is provided, for example in the form of a tongue, connected to the first and second sets of blades and rotatably secured to a horizontal blade and translatable thereon. In this way, rotating the actuator causes the rotation of the horizontal blades, while translating the actuator on the horizontal blade causes the rotation of the vertical blades.

In these devices, it is preferable for the user to feel a click when the actuator reaches an extreme position or an intermediate position when it is translated on the vertical blade. In fact, since the vertical blades are hidden by the horizontal blades, it is difficult for the user to know what position they are in. Thus, the click position allows the user to have an idea of the position of the vertical blades. To produce that click, it is for example proposed to provide a spring leaf extending from one edge of the first blade or the tongue, in the same plane as the latter parts, and a recess provided in the tongue or in the first blade, the recess also extending in the same plane as those parts. In this way, when the tongue is translated along the blade and the spring leaf is located across from the recess, the spring leaf relaxes in the recess, causing the click. Such a device is for example described in documents DE-20 2004 006 461 or DE-20 2006 009 352.

For tongues having a long translational travel on the blade, a friction element is generally provided applying a certain friction on the blade to oppose a certain resistance to translation. This element extends inside the body of the tongue between that body and the blade in the same plane as the blade and the tongue so as to be invisible from the outside of the device.

However, adding this device can be impossible due to the presence of the spring leaf extending in the same plane as the tongue and the blade. Furthermore, if one nevertheless manages to install the friction element and the spring leaf, the forces exerted in the plane of the blade are too significant for the fastening means for fastening the tongue on the blade (fastening done by clips made from plastic, for example). The presence of the spring leaf also adds an additional part to the air outlet device, which involves more complicated manufacturing and additional production costs.

SUMMARY

One aim of the invention is to offset these drawbacks by proposing an air outlet device that is easy to implement and allowing the user to feel a click in certain positions of the actuator, while preserving the possibility of adding a friction element between the actuator and the blade.

To that end, the invention relates to an air outlet device of the aforementioned type, wherein the first blade comprises at least one projection extending substantially transversely from a longitudinal surface of the first blade, the actuator comprising an opposite projection extending substantially transversely opposite said longitudinal surface such that the projection pushes the opposite projection in a transverse direction when the actuator is translatably moved on the first blade and when the opposite projection comes into contact with the projection.

The projection and the opposite projection extending substantially transversely make it possible to produce a click when they come into contact with each other so that the user perceives information on the position of the second blade. Furthermore, since these projections extend transversely, the longitudinal plane is freed, for example to install a friction element.

According to other features of the air outlet device:
- the longitudinal surface of the first blade bearing the projection is the lower surface of said first blade;
- the longitudinal surface of the first blade comprises a plurality of projections extending substantially transversely, said projections being spaced apart from one another on said longitudinal surface so as to define a plurality of positions in which the opposite projection is moved in a transverse direction;
- the actuator forms a tongue surrounding part of the first blade, said actuator comprising a flexible longitudinal surface arranged across from the longitudinal surface bearing the projection of the first blade, the opposite projection extending substantially transversely from said flexible longitudinal surface toward said longitudinal surface of the first blade;
- the actuator comprises a friction element applied against the first blade, said friction element extending substantially in the same plane as said first blade;
- the actuator comprises a fastening element in the form of a fork, said fastening element extending between the first and second blades, said second blade being inserted into said fork so as to connect the actuator to said second blade;
- the device comprises a plurality of first blades extending substantially longitudinally above one another, said first blades being rotatably secured around substantially longitudinal axes, the actuator being fastened on one of said first blades so that rotating said actuator causes the rotation of the set of said first blades; and
- the device comprises a plurality of second blades extending substantially transversely next to one another, said second blades being rotatably secured around substantially transverse axes, the actuator being fastened to one of said second blades so that translating said actuator causes the rotation of the set of said second blades.

The invention also relates to a dashboard for a motor vehicle, of the type comprising at least one air outlet opening, connected to an aeration system of the motor vehicle and in which an air outlet device as described above is arranged in said opening so as to control the direction of the air leaving said aeration system.

BRIEF DESCRIPTION OF THE DRAWINGS

Other aspects and advantages of the invention will appear upon reading the following description, provided as an example and done in reference to the appended drawings, in which.

DETAILED DESCRIPTION OF THE ILLUSTRATED EMBODIMENT

In the description, the term "longitudinal" is defined according to the directions extending in the plane defined by the length and width of the motor vehicle, i.e. a substantially horizontal plane, and the term "transverse" is defined along a plane perpendicular to the longitudinal plane, i.e. a substantially vertical plane corresponding to the height of the motor vehicle. The terms "front" and "rear" are defined in relation to the usual directions of an assembled motor vehicle.

Figure 1:
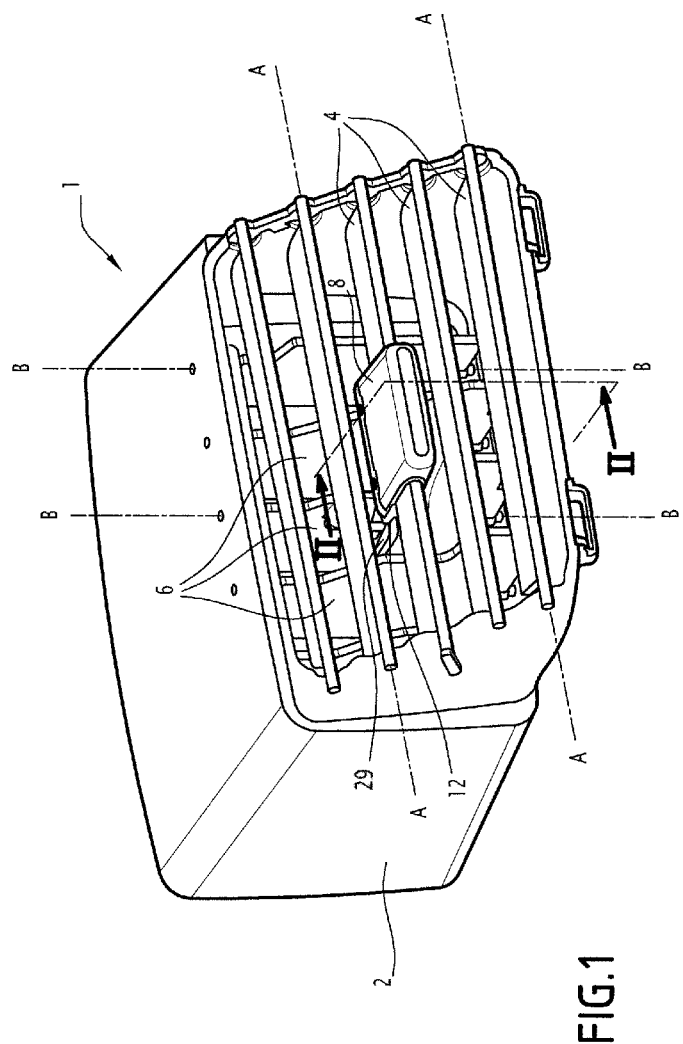
FIG. 1 is a diagrammatic perspective illustration of an air outlet device according to the invention.

In reference to FIG. 1, an air outlet device 1 is described, designed, traditionally, to cover an air outlet opening provided in a dashboard (not shown) and connected to an aeration system (not shown).

The device 4 comprises a body 2 mounted on the end portion of a guide duct for the air connecting the aeration system to the air outlet opening. The body 2 can be made in a single piece with the guide duct for the air. The body 2 is hollow so as to allow the air to circulate.

Traditionally, a set of first blades 4 extending longitudinally is rotatably mounted through the body 2. The first blades 4 are arranged above one another so as to be distributed over the height of the body 2. Each first blade 4 is movable around a longitudinal axis A and the first blades 4 are rotatably secured to one another, i.e. rotating one first blade 4 causes the other first blades 4 to rotate.

Also traditionally, the device comprises a set of second blades 6 extending transversely, the second blades 6 being rotatably mounted through the body 2. The second blades 2 are arranged next to one another so as to be distributed over the width of the body 2. Each second blade 6 is movable around a transverse axis B and the second blades 6 are rotatably secured to one another, i.e. rotating one second blade 6 causes the other second blades 6 to rotate. The set of second plates 6 extends in front of the set of first blades 4, so that the first blades 4 hide the second blades 6, as shown in FIG. 1.

The device 1 comprises an actuator 8 arranged to control the rotation of the set of first blades 4 and the set of second blades 6.

To that end, the actuator 8 is mounted on one of the first blades 4, for example the first blade 4 extending substantially at the center of the body 2, so as to be rotatably secured to said first blade 4. In this way, rotation around the longitudinal axis A of the actuator 8 causes the rotation of the first blade 4 on which the actuator 8 is mounted, and therefore a movement of all of the first blades. The rotation of the actuator 8 is done substantially from bottom to top, and vice versa, and the first blades 4 thereby make it possible to orient the flow of air leaving the aeration system in a substantially vertical direction.

The actuator 8 is also translatably movable on the first blade 4 on which the actuator 8 is mounted. In this way, the actuator 8 can move along the longitudinal axis A between two end positions 10 (shown in FIG. 4). The actuator 8 comprises fastening means 12 for fastening to a second blade 6, for example the second blade 6 extending substantially at the center of the body 2, so that a translational movement of the actuator 8 causes the second blade 6 to rotate, and therefore causes a movement of all of the second blades 6, around the substantially transverse axis B. The translational movement of the actuator 8 is done from right to left and vice versa, and the second blades 6 thereby make it possible to orient the flow of air leaving the aeration system in a substantially horizontal direction.

Figure 2:
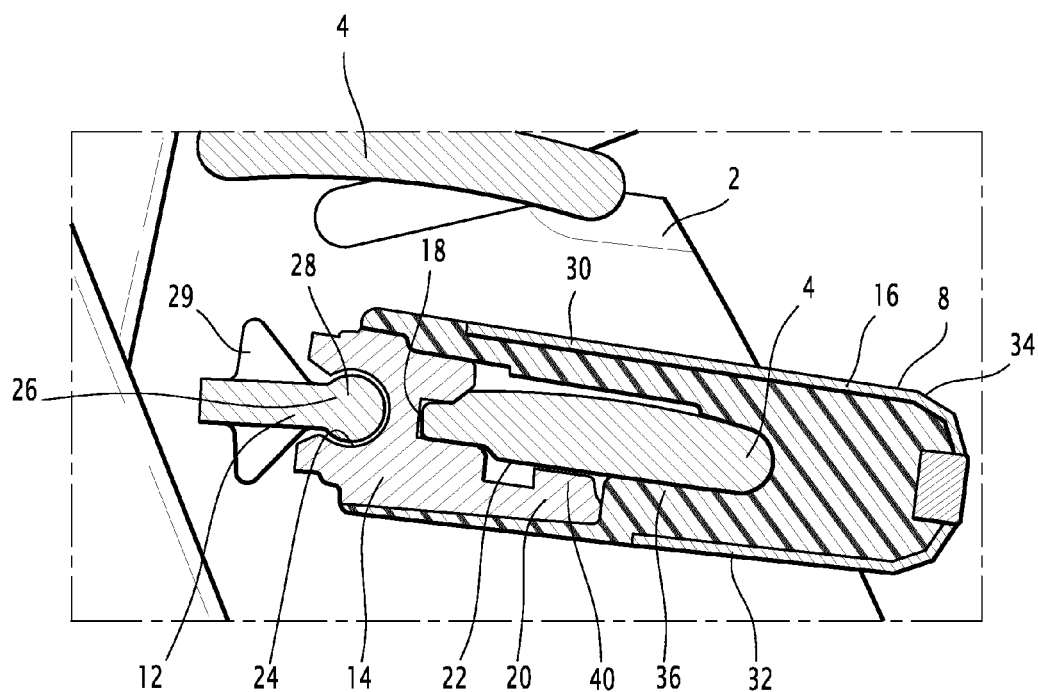
FIG. 2 is a diagrammatic cross-sectional illustration of part of the air outlet device along axis II-II of FIG. 1.

The actuator 8 is in the shape of a tongue surrounding part of the first blade 4, as shown in FIGS. 1 and 2. The actuator 8 is for example made up of several parts, including a main body 14 on which a cover 16 is fastened. The main body 14 and the cover 16 are for example made from a plastic material.

Figure 3:
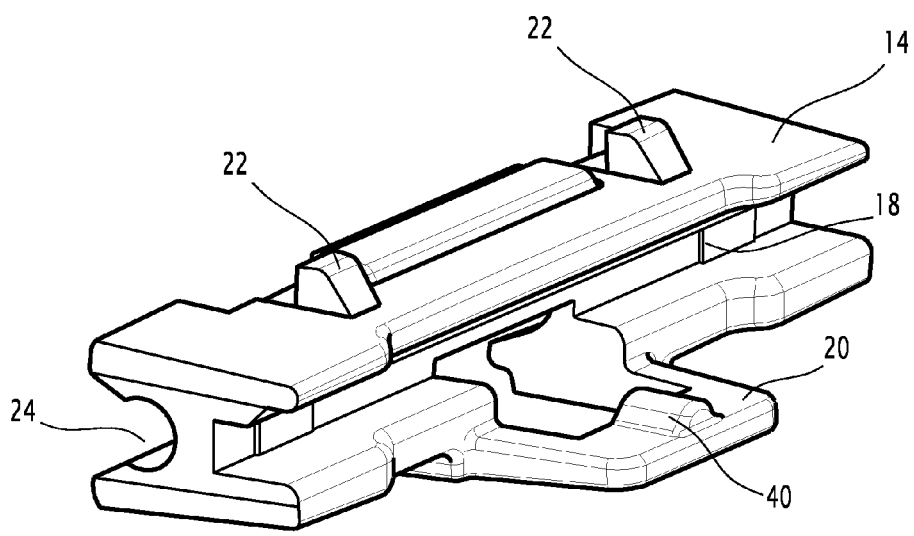
FIG. 3 is a diagrammatic perspective view of part of the actuator of the air outlet device according to the invention.

The main body 14 is shown in FIG. 3 and comprises a slot 18 receiving the front end portion of the first blade 4 and a flexible lower longitudinal surface 20 extending toward the back from the slot 18 so as to extend across from the lower surface 22 of the blade, as shown in FIG. 2.

The flexible longitudinal surface 20 forms a tongue capable of elastically deforming downwardly due to the material used to make the main body 14.

The main body 14 also comprises clipping means 22 protruding from the upper surface of the main body and making it possible to fasten the cover 16 on the body 14.

Lastly, the main body 14 comprises a housing 24 extending across from the slot 18 in which the fastening means 12 are housed at one of the second blades 6. The fastening means 12 are formed by a fastening element 26 comprising an anchor portion 28, with a shape substantially complementary to the housing 24, as shown in FIG. 2, and a portion in the shape of a fork 29, visible in FIG. 1. The fork-shaped portion 29 extends between the front of the first blade 4 and the back of the second blade 6, the rear end portion of which is inserted between the teeth of the fork-shaped portion 29 so as to connect the actuator 8 to the second blade 6.

The cover 16 forms the upper longitudinal surface 30 of the actuator 8 and surrounds the rear end portion of the first blade 4 opposite the slot 18. The cover 16 closes the actuator 8 by a lower longitudinal portion 32 surrounding the flexible longitudinal surface 20 of the main body 14, as shown in FIG. 2. The cover extends beyond the rear end portion of the first blade 4 in the longitudinal plane so as to form a gripping means 34 for gripping of the actuator 8 by the user. The cover 16 is fastened on the body 14 by the clipping means 22.

The friction element 36 is arranged between the cover 16 and the main body 14 so as to surround a portion of the first blade 4 and to be applied against it, as shown in FIG. 2. The friction element 36 extends substantially in the longitudinal plane between the upper longitudinal surface 30 and the lower longitudinal portion 32 of the cover, and surrounds the rear end portion of the first blade 4. The friction element 36 offers a certain resistance to the translational movement of the actuator 8, such that a certain force must be applied on the actuator 8 to move it. This prevents the actuator 8 from moving alone without a user actuating it. The friction element 36 is for example formed by a silicone, rubber, or other pad.

Figure 4:
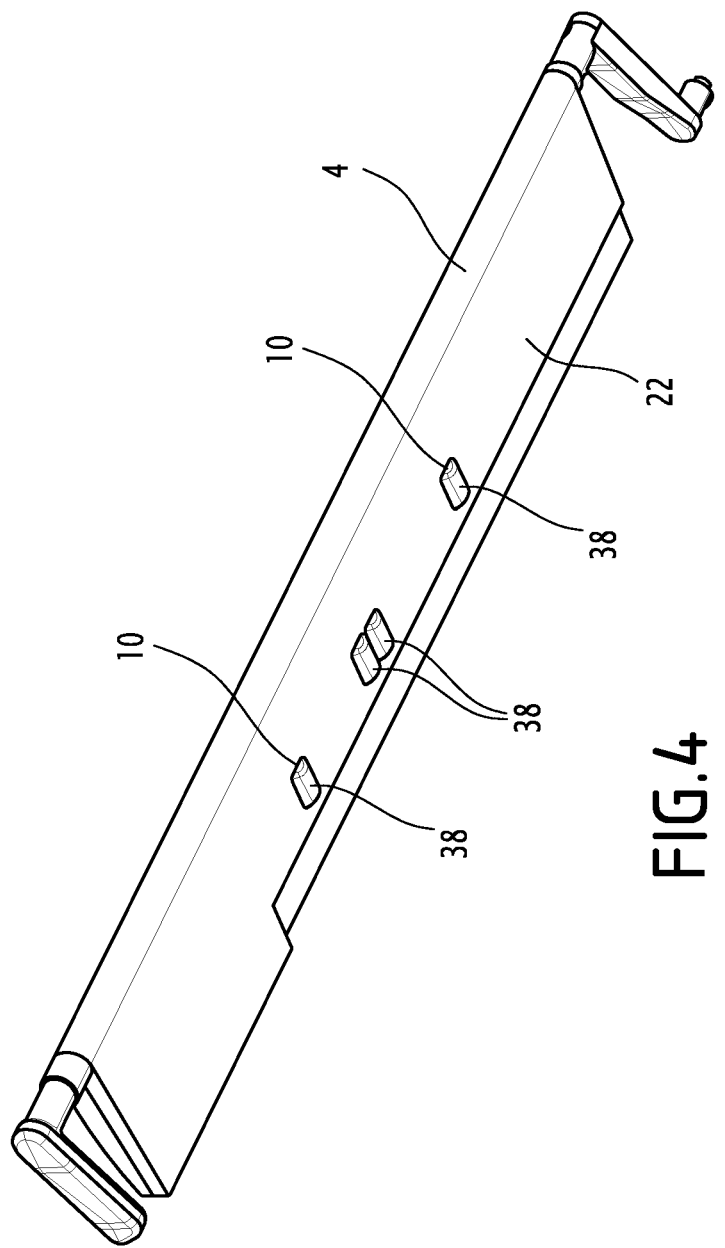
FIG. 4 is a diagrammatic perspective view of the first transverse blade.

As shown in FIG. 4, the lower longitudinal surface 22 of the first blade 4 on which the actuator 8 is mounted comprises a plurality of projections 38 extending in a transverse direction relative to the lower longitudinal surface 22. The projections 38 therefore extend downward from the first blade 4. The projections 38 are spaced apart from one another along the lower longitudinal surface 22. A projection 38 is for example arranged in the vicinity of each end position 10 of the translational movement of the actuator 8 and two projections 38 are for example arranged substantially at the center between those two end positions 10 to define a central position, corresponding to a position of the second blades 6 in which they extend substantially perpendicular to the body 2 of the device and the first blades 4.

The flexible longitudinal surface 20 of the main body 14 of the actuator 8 bears an opposite projection 40 extending substantially transversely upward across from the lower longitudinal surface 22 of the first blade 4. When the actuator 8 is translatably moved, the opposite projection 40 moves between the projections 38. When the opposite projection 40 encounters a projection 38, the latter pushes the opposite projection 40 transversely downward due to the flexibility of the flexible longitudinal surface 20, and when the flexible longitudinal surface returns to its initial non-deformed position, a click is felt by the user. In this way, the user feels this click when the actuator 8 encounters a projection 38 indicating a particular position of the second blades. The user thus obtains information on the position of the second blades 6 that he cannot see, as they are hidden by the first blades 4.

Providing the projections 38 and 40 on the lower longitudinal surfaces of the first blade 4 and the body 14 of the actuator 8 makes it possible to make the means allowing the click invisible from the outside. Furthermore, since these means extend in a transverse and non-longitudinal direction, the longitudinal plane is released to house the friction element 36, as described above. Lastly, an excessive longitudinal force is not applied on the clipping means 22, which would be the case if the friction element 36 and the means making it possible to produce the click extended in the longitudinal plane, and which could cause damage to the actuator 8.

The actuator 8 and the blades 4 and 6 are made from a plastic material, and the opposite projection 40 is made in a single piece with the main body 14. In this way, no metal elements are necessary, and the manufacturing and installation costs and times of the air outlet device 1 are therefore particularly reduced.

The air outlet device 1 described above was described in relation to a dashboard, but may of course be used with other parts of the motor vehicle in which an air outlet opening is provided.

The invention claimed is:

1. An air outlet device for an aeration system for a motor vehicle, comprising at least one first blade, extending substantially longitudinally and being rotatable around a substantially longitudinal axis, and at least one second blade, extending substantially transversely and being rotatable around a substantially transverse axis, the device comprising an actuator connected to the first blade and second blade, said actuator being rotatably secured to the first blade so as to allow the movement of the first blade around the longitudinal axis and being translatable on said first blade so as to allow the movement of the second blade around the transverse axis, wherein the first blade comprises a plurality of projections extending substantially transversely from a longitudinal surface of the first blade, said plurality of projections being spaced apart from one another on said longitudinal surface, the actuator comprising an opposite projection extending substantially transversely opposite said longitudinal surface such that the plurality of projections push the opposite projection in a transverse direction perpendicular to the longitudinal axis when the actuator is translatably moved along the longitudinal axis across said plurality of projections on the first blade and when the opposite projection comes into contact with each of the plurality of projections, wherein the plurality of projections define a plurality of positions in which the opposite projection may be moved in a transverse direction and the opposite projection of the actuator is translatable on the first blade along the longitudinal axis, wherein one or more of the plurality of projections on the first blade are configured to allow movement of the actuator in one direction along the longitudinal axis and the opposite direction along the longitudinal axis wherein the actuator comprises a main body comprising a slot receiving an end portion of the first blade.

2. The device according to claim 1, wherein the longitudinal surface of the first blade bearing the plurality of projections is the lower surface of said first blade.

3. The device according to claim 1, wherein the actuator forms a tongue surrounding part of the first blade, said actuator comprising a flexible longitudinal surface arranged across from the longitudinal surface bearing the plurality of projections of the first blade, the opposite projection extending substantially transversely from said flexible longitudinal surface toward said longitudinal surface of the first blade.

4. The device according to claim 1, wherein the actuator comprises a friction element applied against the first blade, said friction element extending substantially in the same plane as said first blade.

5. The device according to claim 1, wherein the actuator comprises a fastening element in the form of a fork, said fastening element extending between the first and second blades, said second blade being inserted into said fork so as to connect the actuator to said second blade.

6. The device according to claim 1, wherein the device comprises a plurality of said first blades extending substantially longitudinally above one another, said first blades being rotatably secured around substantially longitudinal axes, the actuator being fastened on one of said first blades so that rotating said actuator causes the rotation of the set of said first blades.

7. The device according to claim 1, wherein the device comprises a plurality of said second blades extending substantially transversely next to one another, said second blades being rotatably secured around substantially transverse axes, the actuator being fastened to one of said second blades so that translating said actuator causes the rotation of the set of said second blades.

8. A dashboard for a motor vehicle, said dashboard comprising at least one air outlet opening, connected to an aeration system of the motor vehicle, wherein an air outlet device according to claim 1, is arranged in said opening so as to control the direction of the air leaving said aeration system.

9. The device according to claim 1, wherein the first blade is a front blade and the second blade is a rear blade, the first blade being located downstream relative to the second blade in respect to the flow of air.

10. The device according to claim 1, wherein each projection of the plurality of projections is symmetrical with respect to a transverse axis.

11. The device according to claim 1, wherein each projection of the plurality of projections is rounded.

12. The device according to claim 1, wherein each projection of the plurality of projections is a semi-cylindrical shape.

13. The device according to claim 1, wherein the main body comprises a housing extending across from the slot in which the second blade is fastened.

14. The device according to claim 1, wherein the main body comprises a flexible longitudinal surface arranged across from the longitudinal surface bearing the plurality of projections on the first blade, the opposite projection extending substantially transversely from said flexible longitudinal surface toward said longitudinal surface of the first blade.

\* \* \* \* \*